United States Patent [19]

Brodesser

[11] 4,017,827
[45] Apr. 12, 1977

[54] LIGHT FLASHER SYSTEM FOR TRAVEL TRAILERS

[76] Inventor: Klaus J. Brodesser, 154 Sawyer Ave., West Babylon, N.Y. 11704

[22] Filed: Oct. 23, 1975

[21] Appl. No.: 625,108

[52] U.S. Cl. .......................... 340/81 R; 307/10 LS
[51] Int. Cl.² .................. B60Q 1/00; B60Q 1/46
[58] Field of Search ................. 340/81 R, 72; 307/10 LS, 10 R

[56] References Cited

UNITED STATES PATENTS

| | | | |
|---|---|---|---|
| 3,560,923 | 2/1971 | Parkes | 340/81 R |
| 3,562,707 | 2/1971 | Parkes | 340/81 R |
| 3,970,860 | 7/1976 | Purdy | 307/10 LS |

FOREIGN PATENTS OR APPLICATIONS 1,266,556  6/1961  France .................. 340/81 R Primary Examiner—Donald J. Yusko
Attorney, Agent, or Firm—Morris Liss

[57] ABSTRACT

The cable from a travel trailer is disconnected from a mating connector of a towing vehicle. The trailer cable is then plugged into a flasher module to cause flashing of the trailer running, side and overhead lights. Energization of the flashing lights occurs from a battery in the trailer, totally independent from the battery of the towing vehicle.

2 Claims, 2 Drawing Figures

LIGHT FLASHER SYSTEM FOR TRAVEL TRAILERS

FIELD OF THE INVENTION

The present invention relates to light flashers for vehicles, and more particularly to a system for operating the lights of a travel trailer, independently from a towing vehicle power supply.

BRIEF DESCRIPTION OF THE PRIOR ART

Travel trailers, of the recreational vehicle type are generally equipped with a number of lights, such as running, side and overhead clearance lights. While in transiit with a towing vehicle, a cable connects the trailer lights with the electrical system of the towing vehicle, so that the trailer lights are energized by the towing vehicle electrical system. However, when the trailer is parked and the towing vehicle is to be disconnected, it is desirable to operate the lights of the trailer in a flashing mode. This is particularly advantageous so that no matter which side or angle the disconnected trailer is later approached while parked, the flashing indicators will be easily seen. With present trailers, this is not possible although many trailers are equipped with their own battery for operating accessories within the trailer. Thus, it would be advantageous to adapt the usual trailer cable in a manner whereby electrical power could be furnished from the trailer vehicle to the trailer cable, via a flasher so that the trailer lights could be made to flash from power supplied by the trailer, completely independently from the towing vehicle.

BRIEF DESCRIPTION OF THE PRESENT INVENTION

The present invention incorporates a flasher module which will accommodate the connector end of a trailer cable, when the trailer is disconnected from the towing vehicle. As a result, the lights of the trailer can be made to flash from the trailer battery which makes the light system completely independent from the battery of the towing vehicle.

The present invention is designed so that no electrical connections need be made, nor is wiring involved. The invention can be installed by anyone having basic knowledge of the use of hand tools.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE PRESENT INVENTION

Figure 1:
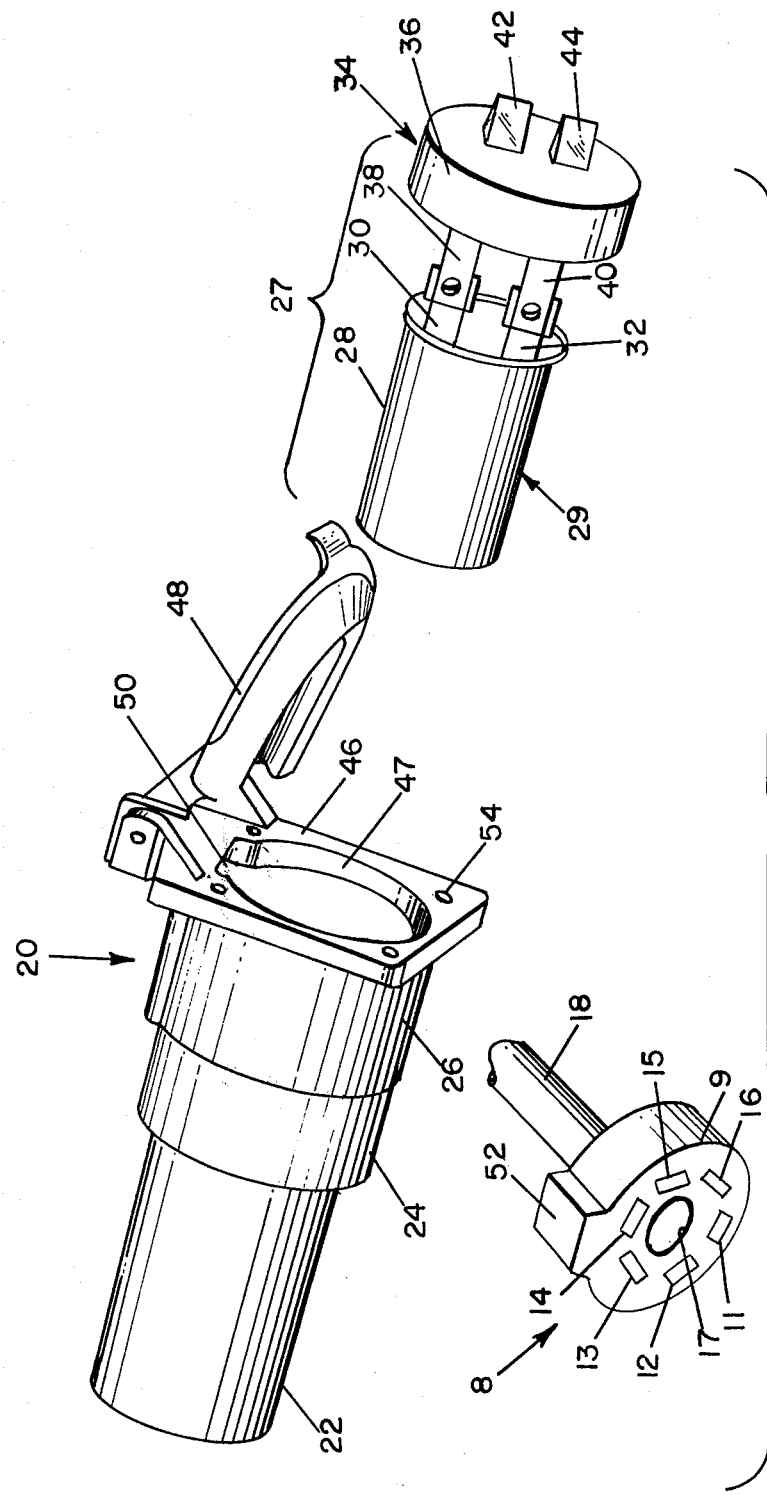
FIG. 1 is a disassembled view of the present invention indicating the individual parts thereof.

Referring to the figures, and more particularly FIG. 1 thereof, reference numeral 8 generally indicates a connector 8 that is customarily connected from a travel trailer to a mating connector (not shown) from a towing vehicle so that power from the towing vehicle electrical system may be applied to the various lights of the trailer. The connector 8 generally includes a base portion 9 having individual female contacts located therein. Contact 11 is a common ground between the electrical system of the trailer and the towing vehicle. Contact 12 is for the brake lights of the trailer, and energization through contact 12 occurs when the brake pedal of the towing vehicle is depressed. Contact 13 is in circuit with the tail and running lights of the trailer. Contact 14 is directly connected to a battery located within the trailer itself, independent from the battery of the towing vehicle. During connection of the connector 8 with the mating connector (not shown) of the towing vehicle, the battery of the trailer becomes charged by the electrical system of the towing vehicle. Contact 15 is in circuit with the stop and left-hand turn signal lights of the trailer. Contact 16 is in contact with the stop and right-hand turn signal lights of the trailer. Contact 17 is connected in circuit with the back-up lights or auxiliary ground of the trailer. These aforementioned contacts complete circuits with the mentioned lights through the cable 18.

A housing, generally indicated by reference numeral 20 is attached to the body of a trailer (not shown). The housing includes three coaxial communicating cylindrical portions 22, 24 and 26 to receive similarly dimensioned portions of a flasher module 27. The body portion 28 of a heavy duty flasher 29 is received within the housing portion 22. The flasher is of conventional design and includes the usual dual prong connectors 30 and 32. An adapting connector 34 is connected to the prongs 30 and 32 of the flasher, by connecting strips 38 and 40. The connection may be made by suitable means such as fasteners, soldering or the like. The body 36 of the adapting connector is generally indicated by reference numeral 34 which is received within the cylindrical portion 24 of the housing 20. Two prongs 42 and 44 extend outwardly from the adapting connector 34.

In operation of the device, when a towing vehicle is connected with the travel trailer, the connctor 8 is disconnected from the flasher module 27 and is connected with a mating connector (not shown) of the towing vehicle so that the towing vehicle electrical system is connected with the trailer lights. However, when the towing vehicle is disconnected and the lights of the trailer are to be flashed, the connector 8 is disconnected from the vehicle and is connected with the flasher module 27. A key 52 is formed in the body portion 9 of the conector 8 so that contact is made between the prongs 42, 44 and contacts 13 and 14. When this occurs, the battery within the trailer becomes connected to the trailer lights, through the flasher module 27 thus causing the lights to flash. A keyway 50 is formed in an outward flange 46 of the housing 20. A hingedly mounted cover 48 is connected to the flange 46 for weather protection. An aperture 47 is formed in the central portion of the flange 46 to receive the flasher module 27 in the housing 20. The key 52 mates with the keyway 50 so that proper alignment occurs between the prongs 42, 44 and the contacts 13, 14. Apertures 54 are formed in the flange 46 to permit fastener securement of the housing 20 to the body of a trailer.

Figure 2:
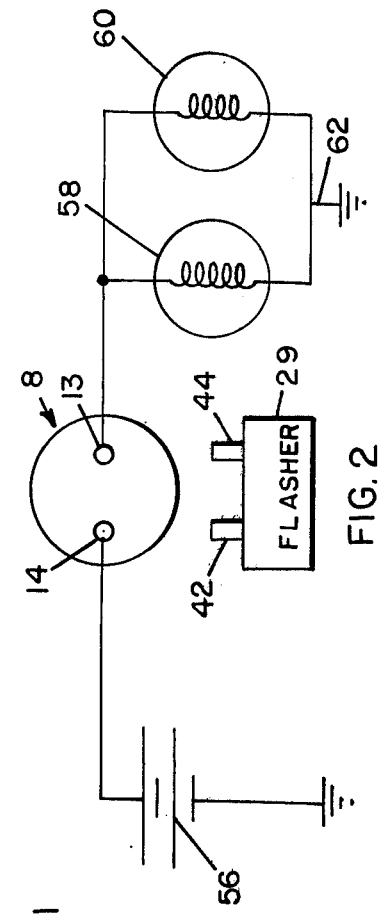
FIG. 2 is an electrical schematic diagram of the equivalent circuit of the present invention.

FIG. 2 illustrates the equivalent circuit that results from the present invention. A battery 56, located in the trailer and independent from the towing vehicle is connected to the contact 14 through the cable 18 (FIG. 1). Contact 13 is connected with a first terminal of parallel connected lamps 58 and 60. Although two lamps are illustrated, it is to be understood that a multiplicity of lamps may be incorporated in the connection, such as running, side and overhead clearance lamps. The opposite end of the parallel connected lamps is grounded. When connection occurs between the flasher 29 and the connector 8, a circuit is completed between the trailer battery 56 and the lamps 58, 60 through the flasher. As a result, the trailer lights will flash as desired.

When the towing vehicle is again connected to the trailer and is to be moved, the connector 8 is disconnected from the flasher module 27 and is again reconnected to the mating connector of the towing vehicle.

It should be understood that the invention is not limited to the exact details of construction shown and described herein for obvious modifications will occur to persons skilled in the art.

I claim as my invention:

1. In a trailer having lights normally energized from the battery of a towing vehicle and also having a light flashing system to be energized from a battery in the trailer, the flashing system comprising:
    a cable connected at a first end to the preselected trailer lights and a trailer battery, separately;
    a trailer connector connected at the second end of the cable, the connector being removably attachable to a mating connector from a towing vehicle for deriving power from the vehicle battery fo the trailer lights when the vehicle is attached to the trailer; and
    flasher means mounted to the trailer, the flasher means having contacts thereon for mating with the trailer connector when it is disconnected from the mating vehicle connector, thereby selectably connecting the trailer battery to the trailer lights through the flasher means, which is series connected with the lights, causing the trailer lights to flash independently of the vehicle battery, which enables the trailer lights to flash, even when the trailer is unhitched from the towing vehicle.

2. The subject matter set forth in claim 1 wherein the flasher means comprises:
    a housing to be mounted to the trailer; and
    a flasher module removable inserted in the housing, the module having a flasher device connected to an adapter connector for coupling with the trailer connector.

* * * * *